(12) United States Patent
Kajanto et al.

(10) Patent No.: US 11,046,788 B2
(45) Date of Patent: Jun. 29, 2021

(54) METHOD AND APPARATUS FOR CONTROLLING THE CATALYTIC OXIDATION OF CELLULOSE

(71) Applicant: UPM-KYMMENE CORPORATION, Helsinki (FI)

(72) Inventors: Isko Kajanto, Espoo (FI); Markus Nuopponen, Helsinki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 207 days.

(21) Appl. No.: 15/536,844

(22) PCT Filed: Dec. 18, 2015

(86) PCT No.: PCT/FI2015/050897
§ 371 (c)(1),
(2) Date: Jun. 16, 2017

(87) PCT Pub. No.: WO2016/097489
PCT Pub. Date: Jun. 23, 2016

(65) Prior Publication Data
US 2017/0349670 A1    Dec. 7, 2017

(30) Foreign Application Priority Data
Dec. 18, 2014    (FI) .................................... 20146116

(51) Int. Cl.
| | |
|---|---|
| *C08B 15/04* | (2006.01) |
| *G01N 27/416* | (2006.01) |
| *C08B 17/06* | (2006.01) |
| *B01J 14/00* | (2006.01) |
| *B01J 19/00* | (2006.01) |

(52) U.S. Cl.
CPC ............... *C08B 15/04* (2013.01); *B01J 14/00* (2013.01); *B01J 19/0006* (2013.01); *C08B 17/06* (2013.01); *G01N 27/4168* (2013.01); *B01J 2219/00186* (2013.01); *Y02P 20/582* (2015.11)

(58) Field of Classification Search
CPC ....................................................... C08B 15/04
USPC ......................................................... 536/124
See application file for complete search history.

(56) References Cited

U.S. PATENT DOCUMENTS

| | | | |
|---|---|---|---|
| 3,745,065 A | 7/1973 | Rama | |
| 4,581,121 A | 4/1986 | Dailey et al. | |
| 5,821,214 A * | 10/1998 | Weibel | ....... C11D 3/14 510/368 |
| 9,296,829 B2 * | 3/2016 | Isogai | ....... D06M 11/34 |
| 2005/0244328 A1 | 11/2005 | Schmitz et al. | |
| 2014/0110070 A1 | 4/2014 | Vuorinen et al. | |

FOREIGN PATENT DOCUMENTS

| | | |
|---|---|---|
| GB | 1423314 | 2/1976 |
| WO | 2009107637 A1 | 6/2011 |
| WO | 2012168562 A1 | 12/2012 |
| WO | 2014091086 A1 | 6/2014 |

OTHER PUBLICATIONS

Anelli et al "Fast and Selective Oxidation of Primary Alcohols to Aldehydes or to Carboxylic Acids and of Secondary Alcohols to Ketones Mediated by Oxoammonium Salts under Two-Phase Conditions"; J. Org. Chem; 1987; 52; 1952-2559.
Fan et al "Tempo-Mediated Oxidation of B-Chitin to Prepare Individual Nanofibrils"; Carbohydrate Polymers; 2009; 77; 832-838.
International Preliminary Report on Patentability; International Application No. PCT/FI2015/050897; International Filing Date Dec. 18, 2015; dated Feb. 1, 2017; 12 pages.
International Search Report; International Application No. PCT/FI2015/05897; International Filing Date Dec. 18, 2015; dated Sep. 6, 2016; 7 pages.
Saito et al "Cellulose Nanofibers Prepared by Tempo-Mediated Oxidation of Native Cellulose"; Biomacromolecules; 2007; 8; 2485-2491.
Saito et al "Tempo-Mediated Oxidation of Native Cellulose. The Effecr of Oxidation Conditions on Chemical and Crystal Structures of the Water-Insoluble Fraction"; Biomacromolecules; 2004; 5; 1983-1989.
Written Opinion of the International Searching Authority; International Application No. PCT/FI2015/050897; International Filing Date Dec. 18, 2015; dated Sep. 6, 2016; 7 pages.
Written Opinion of the International Searching Authority; International Application No. PCT/FI2015/050897; International Filing Date Dec. 18, 2015; dated Nov. 8, 2016; 5 pages.
Xu et al "Influence of Buffer Solution on Tempo-Mediated Oxidation"; Bioresources; 2012 7(2); 1633-1642.
Zhao et al "Oxidation of Primary Alcohols to Carboxylic Acids With Sodium Chlorite Catalyzed by Tempo and Bleach: 4-Methoxyphenylacetic Acid"; Organic Synthesis; 2005; 81; 195-203.

* cited by examiner

*Primary Examiner* — Shaojia A Jiang
*Assistant Examiner* — Everett White
(74) *Attorney, Agent, or Firm* — Cantor Colburn LLP

(57) ABSTRACT

A method for controlling the catalytic oxidation of cellulose includes using a heterocyclic nitroxyl compound as catalyst; oxidizing cellulose in a reaction mixture comprising liquid medium, the catalyst and hypochlorite as main oxidant; analyzing one or more oxidative chlorine species dependent on the hypochlorite concentration of the reaction mixture on line in the reaction mixture or in a gas composition which is in contact with the reaction mixture; and controlling supply of hypochlorite to the reaction mixture on the basis of the analysis.

20 Claims, 2 Drawing Sheets

METHOD AND APPARATUS FOR CONTROLLING THE CATALYTIC OXIDATION OF CELLULOSE

CROSS REFERENCE TO RELATED APPLICATIONS

This is a U.S. national stage of application No. PCT/FI2015/050897, filed on 18 Dec. 2015. Priority under 35 U.S.C. § 119(a) and 35 U.S.C. § 365(b) is claimed from Finland Application No. 20146116 filed on 18 Dec. 2014, the disclosure of which is also incorporated herein by reference in its entirety.

FIELD OF THE INVENTION

The invention relates to a method for controlling the catalytic oxidation of cellulose where a heterocyclic nitroxyl compound is used as catalyst. The invention also relates to an apparatus for carrying out the method.

BACKGROUND OF THE INVENTION

Cellulose is a renewable natural polymer that can be converted to many chemical derivatives. The derivatization takes place mostly by chemical reactions of the hydroxyl groups in the β-D-glucopyranose units of the polymer. By chemical derivatization the properties of the cellulose can be altered in comparison to the original chemical form while retaining the polymeric structure. Reaction selectivity is important so that a derivative of desired chemical structure could be obtained.

Heterocyclic nitroxyl compounds are known as catalysts that participate in the selective oxidation of C-6 hydroxyl groups of cellulose molecules to aldehydes and carboxylic acids, the corresponding oxoammonium salt being known as the active direct oxidant in the reaction series. One of these chemical oxidation catalysts known for a long time is "TEMPO", i.e. 2,2,6,6-tetramethylpiperidinyl-1-oxy free radical. Thus, the oxidized forms of the nitroxyl radicals, N-oxoammonium ions, act as direct oxidants in the oxidation of the target cellulose molecule, whereas a main oxidant is used to bring oxygen to the reaction series and convert the nitroxyl compound back to the oxidized form.

It is known to oxidize primary alcohols to aldehydes and carboxylic acids through "TEMPO" by using sodium hypochlorite as the main oxidant (for example Anelli, P. L.; Biffi, C.; Montanari, F.; Quici, S.; *J. Org. Chem.* 1987, 52, 2559). To improve the yield in the oxidation of the alcohols to carboxylic acids, a mixture of sodium hypochlorite and sodium chlorate was also used (Zhao, M. M.; Li, J.; Mano, E.; Song, Z. J.; Tschaen, D. M.; *Org. Synth.* 2005, 81, 195).

It is also known procedure to catalytically oxidize cellulose in native cellulose fibers through "TEMPO" by using sodium hypochlorite as main oxidant (oxygen source) and sodium bromide as activator (Saito, T. et al.; Cellulose Nanofibers Prepared by TEMPO-Mediated Oxidation of Native Cellulose, *Biomacromolecules* 2007, 8, 2485-2491). The primary hydroxyl groups (C6-hydroxyl groups) of the cellulosic β-D-glucopyranose units are selectively oxidized to carboxylic groups. Some aldehyde groups are also formed from the primary hydroxyl groups. When the fibers of oxidized cellulose so obtained are disintegrated in water, they give stable transparent dispersion of individualized cellulose fibrils of 3-5 nm in width, that is, nanofibrillar cellulose (NFC) or "nanocellulose".

In the oxidation of cellulose, selectivity of the oxidation is important so that chemicals used are not consumed to unwanted side reactions. Selectivity is an indicator of the efficiency of the oxidation reaction to reach the desired oxidized end product.

In practice, the catalytic oxidation is carried out in a reactor in reaction mixture containing cellulosic raw material, the catalyst and possible activator of the catalyst in liquid medium. The reactor is provided with supply of sodium hypochlorite, which acts as the main oxidant, and with supply of alkaline agent, normally sodium hydroxide to keep the pH of the reaction mixture in a desired range which is optimal for the oxidation reaction, for example in view of the selectivity of the oxidation reaction. It is important to add the hypochlorite gradually and in a controlled manner as the oxidation proceeds to avoid excess concentrations of the main oxidant, which may lead to unwanted side reactions and degradation of the hypochlorite. On the other hand, the concentration of the main oxidant should be at a sufficient level to ensure a reasonably fast reaction rate. Thus, the concentration of the hypochlorite should be monitored continuously. This can be done by sampling and determination of the hypochlorite from the samples. Iodometric titration is one known method of determining the hypochlorite concentration. Sampling of the reaction mixture and determination of the hypochlorite takes time and rapid enough response is not achieved to correct the situation, if there are unwanted deviations in the hypochlorite concentration.

To ensure optimal selectivity and rapid enough response in the control of the oxidation process, it is desirable to measure the hypochlorite concentration on-line either continuously or at sufficient frequent intervals. So far, such methods are not available.

SUMMARY OF THE INVENTION

A method is provided for measuring the hypochlorite concentration on-line. The method makes the taking of samples from the reaction mixture unnecessary or it will be needed only for calibration.

In the method, one or more oxidative chlorine species dependent on the hypochlorite concentration of the reaction mixture are analyzed in a gas composition which is in contact with the reaction mixture or in a reaction mixture itself. The hypochlorite concentration can be determined on the basis of this analysis.

The determination of the hypochlorite concentration is an on-line method and the feed rate of hypochlorite to the reaction mixture can be changed rapidly in response to the determination.

The components that are analyzed can be gaseous components containing chlorine (chlorine components), such as molecular chlorine $Cl_2$ and oxides of chlorine, for example chlorine dioxide $ClO_2$ and dichlorine monoxide $Cl_2O$. The gaseous chlorine components are produced by the hypochlorite concentration in the aqueous reaction mixture as the result of the decomposition of hypochlorite. The amount of the gaseous chlorine components that can be measured on the basis of oxidation potential of the chlorine components is directly proportional to the hypochlorite concentration in the reaction mixture. Although hypochlorite is relatively stable at neutral or basic pH and the stability is highest at high pH values, some hypochlorite decomposition producing gaseous chlorine components already takes place at the pH values of the reaction mixture that are used in the catalytic oxidation to avoid side reactions (about 8-9). This decomposition has no practical effect on the consumption of hypochlorite but results in chlorine components on a detectable level in the gas composition.

The gas composition where the analysis of the gas component or components is made is preferably the gas volume directly limited by the reaction mixture volume in the oxidation reactor. The gas components in this gas volume are in equilibrium with the components of the reaction mixture. The oxidation reactor is a closed vessel with a reaction mixture in the lower part and gas space above the level of the reaction mixture in the upper part. In an oxidation reactor of fixed volume, the volume of the gas space is not constant because the volume of the reaction mixture increases due to addition of hypochlorite solution and alkaline agent during the oxidation process, but this does not affect the gas composition. Excess gas can be vented off from the reaction space. The vent duct can be provided with suction so that the gas can be extracted from the closed space either continuously or at the time of measurement. The gas analysis result is more reliable and has better correlation with the hypochlorite concentration, if the reaction mixture is agitated.

The analysis of the gas components to determine the hypochlorite concentration is quantitative analysis of gaseous oxidative chlorine species (both molecular chlorine and oxides of chlorine, especially chlorine dioxide) in the gas composition. Provided that all chlorine is from the hypochlorite, measuring the amount of these gaseous oxidative chlorine species in the gas composition is a way of indirectly measuring the amount of hypochlorite in the reaction mixture, which is in contact with the gas composition (in communication enabling the transfer of gaseous substances from the reaction mixture to the gas composition).

The analysis is carried out by a gas detector capable of detecting and quantitatively determining chlorine. The gas detector contains an electrochemical sensor for detecting chlorine and it gives an electric measurement signal, the magnitude of which is proportional to the amount of the gas components and which can be used in the measuring and control automatics. The gas detectors capable of detecting chlorine can also detect other gaseous decomposition products of chlorine-containing compounds than chlorine, such as oxides of chlorine.

The gas detector can be placed outside the oxidation reactor in such a way that it is in flow communication with the gas space to extract samples of the gas composition from the gas volume.

Gas detectors are widely used in the industry to detect even minute amounts (ppm level) of hazardous gases such as chlorine or chlorine dioxide in the air, and they are available from various manufacturers. Gas analyzers that can detect various gases can be tuned to detect gaseous chlorine components (chlorine and chlorine oxides) important in the determination of hypochlorite.

An alternative for analyzing the one or more oxidative chlorine species in the gas composition, the one or more oxidative chlorine species can be analyzed in the reaction mixture. A redox sensor can be placed in contact with the reaction mixture, either with the volume of the reaction mixture in the reactor or in a circulation loop through which a smaller volume of the reaction mixture flows continuously from the main volume and back to the main volume. The oxidative chlorine species analyzed in the reaction mixture is preferably hypochlorite.

According to one preferred embodiment, the result of the determination is used in the automatic control of hypochlorite dosage to the reaction mixture during the catalytic oxidation process. The dosage can take place continuously or in pulses.

The catalytic oxidation process of cellulose where the oxidative chlorine species in the gas composition or in the reaction mixture are analyzed can be oxidation of cellulose in fibrous starting material, such as pulp. The product of this process is fibrous material where the oxidized cellulose contains carboxylic groups as the consequence of the oxidation.

After the catalytic oxidation process carried out as described above, the oxidized cellulose can be processed to a final cellulose product. When the starting material is pulp derived from plants, especially wood, the cellulose exists in fiber form. The fibers that contain the cellulose in oxidized form are easy to disintegrate by mechanical methods to small-scaled fragments, nanofibrillar cellulose (NFC). In this case the method for forming the cellulose product comprises the first process of catalytic oxidation of the fibrous starting material using the process control as described above, and the second process of disintegration the oxidized starting material to nanofibrillar cellulose.

BRIEF DESCRIPTION OF THE DRAWINGS

In the following, the invention will be described with reference to the appended drawings, where.

DETAILED DESCRIPTION OF THE PREFERRED EMBODIMENTS

Figure 1:
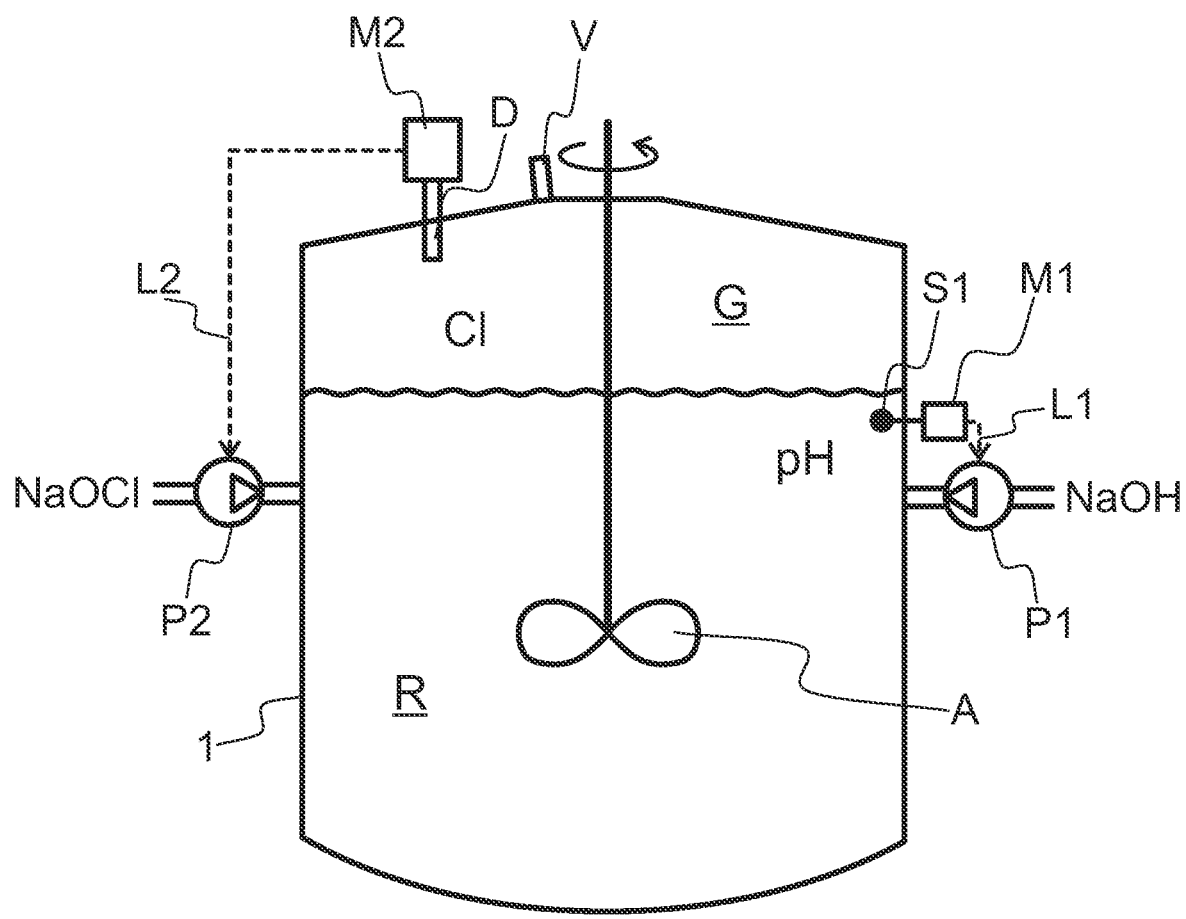
FIG. 1 shows the general principle of the method in form of an oxidation reactor.

In the following disclosure, all percent values are by weight, if not indicated otherwise. Further, all numerical ranges given include the upper and lower values of the ranges, if not indicated otherwise. All results shown and calculations made, whenever they are related to the amount of pulp, are made on the basis of dried pulp.

Catalytic Oxidation Principle

The primary hydroxyl groups of cellulose are oxidized catalytically by a heterocyclic nitroxyl compound, for example 2,2,6,6-tetramethylpiperidinyl-1-oxy free radical, "TEMPO". Other heterocyclic nitroxyl compounds known to have selectivity in the oxidation of the hydroxyl groups of C-6 carbon of the glucose units of the cellulose can also be used, and these compounds are widely cited in the literature. Hereinafter, the oxidation of cellulose refers to the oxidation of these hydroxyl groups to aldehydes and/or carboxyl groups. It is preferred that the hydroxyl groups are oxidized to carboxyl groups, that is, the oxidation is complete. However, the oxidized cellulose can contain, in addition to carboxyl groups, also aldehyde groups.

Whenever the catalyst "TEMPO" is mentioned in this disclosure, it is evident that all measures and operations where "TEMPO" is involved apply equally and analogously to any derivative of TEMPO or any heterocyclic nitroxyl radical capable of catalyzing selectively the oxidation of the hydroxyl groups of C-6 carbon in cellulose. Other known members of this group are the TEMPO derivatives 4-methoxy-TEMPO and 4-acetamido-TEMPO.

As an example of the structure of the heterocyclic nitroxyl compound, the structural formula of "TEMPO" in its radical form is given below.

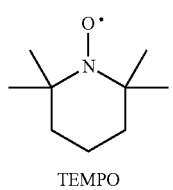

TEMPO

The catalyst is preferably activated to its oxidized from before the catalytic oxidation is started. The activation can be done for example with chlorine dioxide, $ClO_2$, as is described in international applications WO2012168562 and WO2014091086.

In the following description, catalytic oxidation refers to nitroxyl-mediated (such as "TEMPO"-mediated) oxidation of hydroxyl groups. The catalytic oxidation of fibers or fibrous material in turn refers to material which contains cellulose that is oxidized by nitroxyl-mediated (such as "TEMPO"-mediated) oxidation of hydroxyl groups of the cellulose.

The starting concentration of the pulp can be 1-4%, but higher consistencies, in the so-called medium consistency, can also be used. The starting consistency can be higher than 4%, and especially higher than 6%, which has been found to improve the selectivity of the cellulose oxidation as is explained in international applications WO2012168562 and WO2014091086.

If the medium consistency is used, the starting consistency can be in the range of 8-12%.

The reaction mixture contains initially pulp dispersed in aqueous medium and the heterocyclic nitroxyl catalyst. During the oxidation process, the main oxidant, sodium hypochlorite, is supplied to the reaction mixture in a solution. At the same time, alkaline agent, normally a solution of sodium hydroxide, is supplied to the reaction mixture to compensate the acidity caused by the carboxylic groups formed in the cellulose to keep the pH of the reaction mixture at optimum level, usually between 8-9. Due to the continuous supply of the alkaline agent solution and hypochlorite solution, the volume of the reaction mixture will increase and the pulp consistency will somewhat decrease from the initial consistency.

In the catalytic oxidation of cellulose, the aim is to oxidize the cellulose to a target oxidation level which is one variable that is used to identify the quality of the product. The target oxidation level is directly proportional to the amount of the sodium hypochlorite supplied to the reaction mixture. The oxidation level can be expressed as the amount of carboxylic groups, mmol COOH/g pulp as determined by conductometric titration. The cellulose is usually oxidized to an oxidation level between 0.5-1.4 mmol COOH/g pulp, preferably 0.6-1.1 mmol COOH/g pulp. For the purpose of making nanofibrillar cellulose (NFC), it has been found that the oxidation level (conversion degree) of 0.5-1.0 mmol COOH/g pulp, preferably 0.6-0.95 and most preferably 0.7-0.9 is already sufficient that the cellulose fibers can be easily disintegrated to fibrils by mechanical energy.

Oxidation Reactor and Oxidation Control

FIG. 1 shows an oxidation reactor where the method can be applied. The reaction mixture R comprising pulp dispersed in water and the catalyst (activated heterocyclic nitroxyl compound) is placed in a substantially closed tank reactor 1 equipped with agitator A. Alternatively or in addition to the agitator, a circulation loop through which the reaction mixture is circulated back to the reactor by means of a circulation pump, as described in WO2014091086, can be used for agitating the reaction mixture R inside the tank reactor 1. An initial dose of main oxidant (sodium hypochlorite) is also added to the reaction mixture.

The reaction mixture R is in the lower part of the tank reactor 1 and above the volume of the reaction mixture there is a gas space G, which is filled with a gas composition where the amount of at least one gaseous component, which is an oxidative chlorine species, is dependent on the concentration of the hypochlorite in the reaction mixture R. The excess gases can be vented out through a vent V.

The reactor also has a closed control loop L1 for pH control, which comprises a pH sensor S1 inside the reaction mixture R and a measurement transmitter M1 for controlling a pump P1 arranged to supply a solution of alkaline agent (sodium hydroxide) to the reaction mixture so that the pH of the reaction mixture is kept within desired limits. The pH of the reaction mixture is 7-10 preferably 7.5-9.5, most preferably 8-9, which is the optimum range for the selectivity of the oxidation reaction.

Further, the reactor has a second closed control loop L2 for controlling the level of hypochlorite in the reaction mixture R. The second closed control loop L2 comprises a gas analyzer M2, which is placed outside the reactor but can take gas samples through a sample duct D from the gas space G inside the reactor 1. The gas analyzer comprises a gas detector which is an electrochemical sensor. The gas detector can detect gaseous chlorine components in the sample of the gas composition taken from the gas space G. The gas analyzer M2 is also provided with measurement electronics for calculating the concentration of hypochlorite, which can be based on calibration data, and for transmitting a control signal to a pump P2 arranged to supply hypochlorite solution to the reaction mixture so that the level of hypochlorite is kept within desired limits. The pump can respond to the control signal by supplying a pulse of hypochlorite to the reaction medium if the control signal goes below a threshold value, indicating that the hypochlorite concentration in the reaction mixture is too low. The pump can operate in this case by on/off principle. If the pump supplies hypochlorite to the reaction mixture continuously, it can vary the feed rate in response to the control signal.

The gas analyzer M2 comprising the gas detector can also be placed in the vent V, because the gas composition exiting through the vent V corresponds to the composition in the gas space G. The vent can be provided with suction, which can promote the transfer of gaseous components, including the oxidative chlorine species, from the reaction mixture to the gas space. The reactor can be provided with spots for allowing replacement air to flow to the gas space so that excessive underpressure is not generated in the gas space.

On the same control principle, the oxidative chlorine species can be analyzed directly in the reaction mixture on line by means of a redox sensor. The redox sensor can be placed in the reactor in the reaction mixture R, or in a separate circulation loop of the reaction mixture, which can be a circulation loop which circulates the reaction mixture of medium consistency for causing sufficient mixing of the reaction mixture, as described in publication WO2014091086. the oxidative chlorine species is especially hypochlorite.

The measurement signal can be taken outside the reaction mixture and processed in the same way for control purposes as with the gas detector.

In all cases, the measurement electronics need not necessarily calculate the concentration of hypochlorite, but for control purposes, it is sufficient that it gives an electric variable which is proportional to the hypochlorite concentration and which can be used for controlling the pump P2. However, for keeping record of the variation of the hypochlorite concentration in course of the oxidation process it is preferable that the measurement electronics of the gas detector or the measurement electronics of the redox sensor also calculates the concentration values and stores them in a memory.

It is also possible to control the amount of hypochlorite manually, without automatic control, but using the same principle based on gas analysis.

The control system may also take into account the operating pH for the control of hypochlorite level. Because the rate of release of gaseous chlorine components is dependent on pH of the reaction medium, it is possible to use different calibration data for different pH values or pH ranges when the hypochlorite concentration is calculated, or use different control principles in controlling the supply of hypochlorite to the reaction medium.

After the desired conversion degree of the cellulose has been attained, the reaction mixture is taken out from the tank reactor 1 and the oxidized cellulose is processed further.

Further Processing of the Oxidized Cellulose

The fibers of oxidized cellulose are separated from the reaction mixture and processed further. The catalyst can be recovered from the reaction mixture. The separated fibers can be washed and subjected to a second step of complementary oxidation in acidic medium having pH about 1.5-4, preferably 2-3 where remaining aldehyde groups are rapidly oxidized to carboxyl groups with chlorous acid ($HClO_2$) as main oxidant. By the complementary oxidation, the target oxidation level is achieved if it has not been achieved during the catalytic oxidation.

The fibrous starting material, which can be pulp of plant origin, especially wood (softwood or hardwood pulp, for example bleached birch pulp) and where the cellulose molecules are oxidized in the above way is easy to disintegrate to nanofibrillar size, nanofibrillar cellulose or NFC.

The term "nanofibrillar cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 µm. The smallest microfibrils are similar to so called elementary fibrils, which are typically 2-12 nm in diameter. The dimensions of the fibrils or fibril bundles are dependent on raw material and disintegration method. The nanofibrillar cellulose may also contain some hemicelluloses; the amount is dependent on the plant source. Mechanical disintegration of the oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer.

When the oxidized pulp is disintegrated at a consistency of about 1 to 4% in aqueous medium, a clear gel consisting of microfibrils in water (NFC gel) can be obtained.

The NFC prepared from cellulose raw material oxidized with the method above has excellent gelling ability, which means that it forms a gel at a low consistency in aqueous medium.

A characteristic feature of the NFC is its shear thinning behaviour in aqueous dispersion, which is seen as a decrease in viscosity with increasing shear rate. Further, a "threshold" shear stress must be exceeded before the material starts to flow readily. This critical shear stress is often called the yield stress. The viscosity of the NFC can be best characterized by zero-shear viscosity, which corresponds to the "plateau" of constant viscosity at small shearing stresses approaching zero.

The zero-shear viscosity of the NFC measured with a stress controlled rotational rheometer at a concentration of 0.5% (aqueous medium) can vary within wide boundaries, depending for example on the conversion degree of cellulose (oxidation level) and energy input in the disintegration, and it is typically between 1000 and 100000 Pa·s, preferably 5000 and 50000 Pa·s. The yield stress of the NFC determined by the same method is between 1 and 50 Pa, preferably in the range of 3-15 Pa.

Example (Catalytic Oxidation of Pulp)

Never-dried birch pulp was weighted in reaction vessel and mixed, 4% consistency. Activated TEMPO solution was mixed with pulp. Temperature was set to 25° C. NaClO was added to reactor by pump while pulp was mixed strongly. pH was kept under 9 and pH was controlled by NaOH. Gaseous components were monitored by gas detector during the reaction. The gas detector was a chlorine ($Cl_2/O1O_2$) electrochemical sensor. NaClO addition was controlled manually by pumping speed. Pumping speed of NaClO was decreased when optimal NaClO concentration in reaction mixture was achieved based on gas composition analysis.

Figure 2:
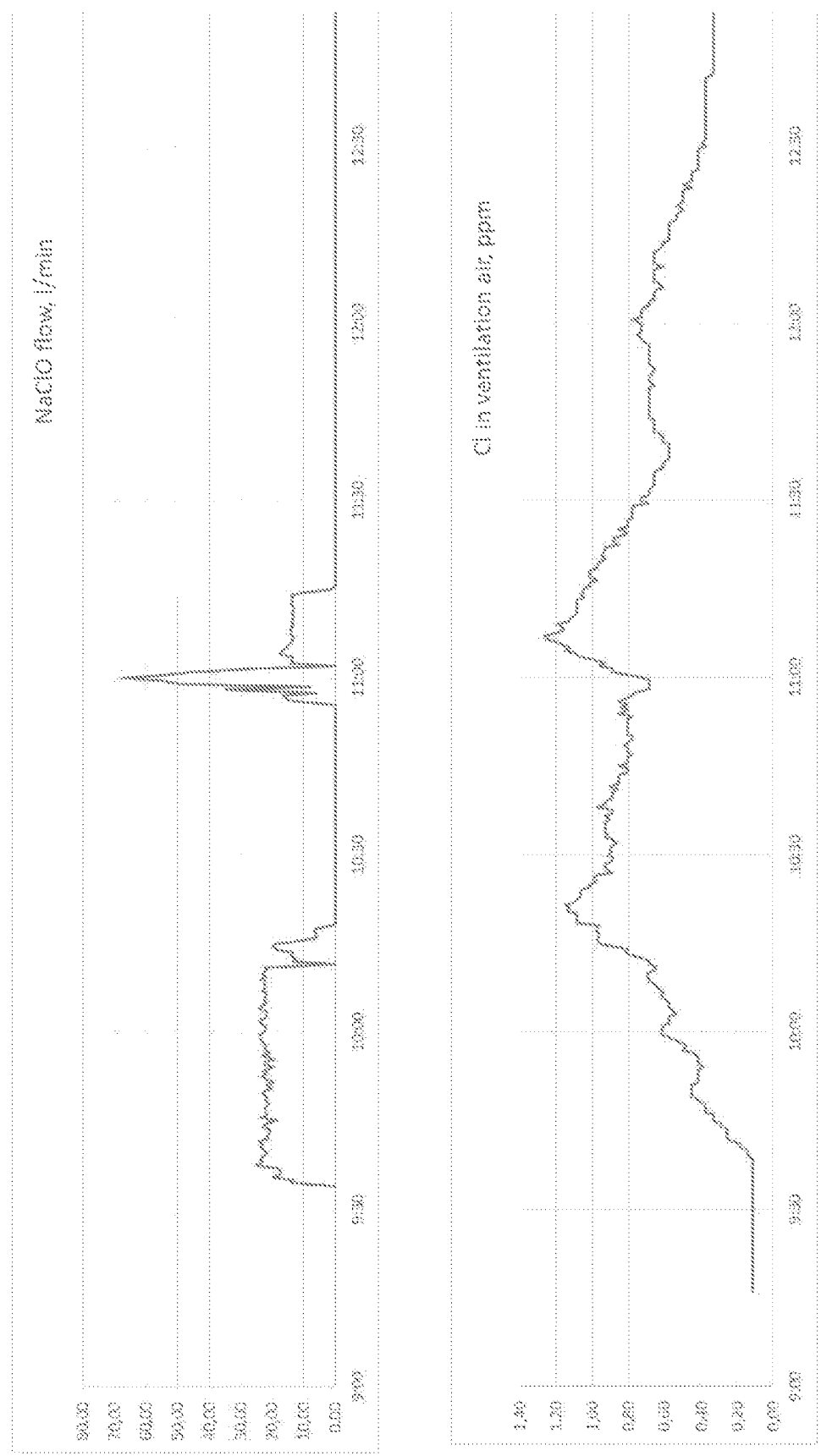
FIG. 2 shows graphs from an oxidation experiment where the method was applied.

FIG. 2 shows detected Cl in ventilation air (lower graph) and NaClO flow in course of the experiment (upper graph). Time is shown in x-axis in hours. In this example, optimal reaction condition was reached when 0.8-1.0 ppm was measured in the ventilation air.

Reaction was stopped when values <0.4 ppm were detected.

The response of the gas detector in form of increased Cl concentration when the NaClO flow was increased is clearly visible in the graphs.

In the experiment, the pumping of the NaClO was continuous but the flow rates below 5 liter/min were recorded as value 0 by the flowmeter.

The example verifies that detectable low concentrations of gaseous substances vary in response to the addition of hypochlorite, and measurement of these concentrations can be used for monitoring of the level of hypochlorite in the process, and for controlling the supply of hypochlorite to maintain the desired process conditions.

The invention claimed is:

1. A method for controlling the catalytic oxidation of cellulose, comprising:
   providing cellulose as a fibrous starting material which is pulp;
   using a heterocyclic nitroxyl compound as catalyst,
   oxidizing cellulose in a reaction mixture comprising liquid medium, the catalyst and hypochlorite as main oxidant,
   analyzing one or more oxidative chlorine species derived from decomposition of hypochlorite in the reaction mixture on line in the reaction mixture or in a gas composition which is in contact with the reaction mixture, wherein an amount of the oxidative chlorine species is directly proportional to the hypochlorite concentration in the reaction mixture; and
   controlling supply of hypochlorite to the reaction mixture on the basis of the analysis;
wherein the method is a method for selective oxidation of C6 hydroxyl groups of cellulose molecules to aldehydes and carboxylic acids.

2. The method according to claim 1, comprising analyzing the oxidative chlorine species by measuring the oxidation potential of the oxidative chlorine species.

3. The method according to claim 1, wherein said one or more oxidative chlorine species are gaseous components that are analyzed in the gas composition.

4. The method according to claim 3, wherein the gaseous components comprise one or more oxides of chlorine.

5. The method according to claim 4, wherein the one or more oxides of chlorine comprise chlorine dioxide ($ClO_2$) and/or chlorine ($Cl_2$).

6. The method according to claim 3, comprising detecting said one or more gaseous components by means of a gas detector.

7. The method according to claim 6, wherein the gas detector contains an electrochemical sensor.

8. The method according to claim 3, wherein said gas composition is in a closed gas space above the level of the reaction mixture.

9. The method according to claim 8, comprising taking a sample of said gas composition from the closed gas space and analyzing the sample outside the closed gas space.

10. The method according to claim 1, comprising analyzing said one or more oxidative chlorine species on line in the reaction mixture.

11. The method according to claim 10, wherein said one or more oxidative species that are analyzed comprise hypochlorite.

12. The method according to claim 10, comprising analyzing said one or more oxidative species by means of a redox sensor.

13. The method according to claim 10, comprising analyzing said one or more oxidative species in the reaction mixture that is circulating in a circulation loop.

14. The method according to claim 1, comprising controlling supply of hypochlorite to the reaction mixture automatically through a closed control loop.

15. The method according to claim 1, wherein the pH of the reaction mixture is between 7 and 10.

16. The method according to claim 15, comprising keeping the pH in the desired range by adding alkaline agent to the reaction mixture.

17. The method according to claim 16, wherein the alkaline agent is NaOH.

18. The method according to claim 1, comprising agitating the reaction mixture during the catalytic oxidation of cellulose.

19. The method according to claim 1, wherein the pH of the reaction mixture is between 7.5 and 9.5.

20. The method according to claim 1, wherein the pH of the reaction mixture is between 8 and 9.

* * * * *